United States Patent
Yamada (10) Patent No.: US 7,475,210 B2
(45) Date of Patent: Jan. 6, 2009

(54) DATA STREAM GENERATION METHOD FOR ENABLING HIGH-SPEED MEMORY ACCESS

(75) Inventor: Hideshi Yamada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 233 days.

(21) Appl. No.: 11/311,700

(22) Filed: Dec. 19, 2005

(65) Prior Publication Data
US 2006/0184737 A1    Aug. 17, 2006

(30) Foreign Application Priority Data
Feb. 17, 2005    (JP)    ............................. 2005-040887

(51) Int. Cl.
*G06F 12/00*    (2006.01)
(52) U.S. Cl. .................... 711/168; 711/118; 711/127; 711/140; 711/154; 345/534; 345/535; 345/537; 345/538; 345/557; 345/564
(58) Field of Classification Search ............... 711/168, 711/118, 127, 140, 154; 345/534, 535, 537, 345/538, 557, 564
See application file for complete search history.

(56) References Cited
U.S. PATENT DOCUMENTS

| | | | | |
|---|---|---|---|---|
| 5,761,706 | A * | 6/1998 | Kessler et al. ............... | 711/118 |
| 5,809,538 | A * | 9/1998 | Pollmann et al. ............ | 711/151 |
| 6,088,772 | A * | 7/2000 | Harriman et al. ............ | 711/158 |
| 6,092,158 | A * | 7/2000 | Harriman et al. ............ | 711/151 |
| 6,324,632 | B1 * | 11/2001 | McIntosh-Smith .......... | 711/173 |
| 6,622,272 | B1 * | 9/2003 | Haverkamp et al. ......... | 714/725 |
| 6,825,848 | B1 * | 11/2004 | Fu et al. ...................... | 345/557 |
| 6,970,966 | B2 * | 11/2005 | Gemelli et al. .............. | 710/305 |
| 7,051,100 | B2 * | 5/2006 | Suzuki et al. ............... | 709/224 |
| 7,200,137 | B2 * | 4/2007 | Dorr et al. ................... | 370/351 |
| 7,216,182 | B2 * | 5/2007 | Henkel ......................... | 710/5 |
| 2001/0047456 | A1 * | 11/2001 | Schrobenhauzer et al. .. | 711/122 |
| 2002/0046251 | A1 * | 4/2002 | Siegel ......................... | 709/213 |
| 2005/0165988 | A1 * | 7/2005 | Kajimura et al. ............ | 710/113 |
| 2006/0184737 | A1 * | 8/2006 | Yamada ....................... | 711/118 |

* cited by examiner

*Primary Examiner*—Stephen C Elmore
(74) *Attorney, Agent, or Firm*—Katten Muchin Rosenman LLP (57) ABSTRACT

An address processing section allocates addresses of desired data in a main memory, input from a control block, to any of three hit determination sections based on the type of the data. If the hit determination sections determine that the data stored in the allocated addresses does not exist in the corresponding cache memories, request issuing sections issue transfer requests for the data from the main memory to the cache memories, to a request arbitration section. The request arbitration section transmits the transfer requests to the main memory with priority given to data of greater sizes to transfer. The main memory transfers data to the cache memories in accordance with the transfer requests. A data synchronization section reads a plurality of read units of data from a plurality of cache memories, and generates a data stream for output by a stream sending section.

18 Claims, 7 Drawing Sheets

FIRST CACHE MEMORY   50a

SECOND CACHE MEMORY   50b

THIRD CACHE MEMORY   50c

DATA STREAM GENERATION METHOD FOR ENABLING HIGH-SPEED MEMORY ACCESS

BACKGROUND OF THE INVENTION

1. Field of the Invention

The invention relates to information processing technologies, and more particularly to an information processing apparatus for reading a plurality of read units of data from a memory and generating a data stream, an information processing method using the apparatus, and a data stream generation method.

2. Description of the Related Art

With the recent remarkable advance of computer graphic technologies and image processing technologies for use in the fields of computer games, digital broadcasting, etc., capabilities for processing data of greater sizes at higher speed are required of information processing apparatuses such as a computer, a game console, and a television set. In order for these information processing apparatuses to achieve sophisticate arithmetic processing, it is effective to improve the processing speed of a processor itself or provide a plurality of processors for parallel processing.

When processors improve in operating speed through such technological development as enhanced operating clocks and multi-processor configuration as described above, a problem of memory access time comes to the surface. One of measures for reducing the access time is to constitute a hierarchical memory system through the introduction of cache memories. Cache memories are auxiliary memories of high speed and small capacities, which copy and store part of data stored in a main memory. In the cases of task processing with uneven data accesses, data to be accessed repeatedly can be stored into cache memories for reduced access time.

Whereas the introduction of cache memories reduces the memory access time, demands for faster information processing apparatuses are increasing day by day. A further reduction in the access time is thus desired. For example, in cache systems, applications having low cache hit rates naturally increase the frequency of accesses to the main memory, thereby making it difficult to obtain performance desired of the information processing apparatuses. In view of manufacturing cost and ease of implementation, however, other improvements for reducing cache-miss penalties by such means as accelerating the main memory, increasing the capacities of the cache memories, and extending the bus bandwidth have limitations in practice.

SUMMARY OF THE INVENTION

The present invention has been achieved in view of the foregoing problems. It is thus an advantage of the present invention to provide a technology for achieving a high-speed memory access in an information processing apparatus.

One of the embodiments of the present invention relates to an information processing apparatus. This information processing apparatus comprises: a plurality of request issuing sections which issue read requests for data stored in a memory; a request arbitration section which accepts the read requests, arbitrates among a plurality of read requests, and transmits them to the memory; and a data synchronization section which stores data read from the memory in accordance with the read requests transmitted, and synchronizes a plurality of read units of data into a single data stream for output. The request arbitration section arbitrates among the plurality of read requests so as to reduce a synchronization latency in the data synchronization section.

Another embodiment of the present invention also relates to an information processing apparatus. This information processing apparatus comprises: a plurality of cache memories; a plurality of hit determination sections provided corresponding to the plurality of cache memories, respectively, the hit determination sections determining whether or not data stored in an input address inside a main memory exists in the cache memories; a plurality of request issuing sections provided corresponding to the plurality of hit determination sections, respectively, the request issuing sections issuing transfer requests for the data from the main memory to the cache memories if it is determined that the data does not exist in the cache memories; a request arbitration section which accepts the transfer requests, arbitrates among a plurality of transfer requests, and transmits them to the main memory; and a data synchronization section which synchronizes a plurality of transfer units of data transferred from the main memory to the plurality of cache memories in accordance with the transfer requests transmitted into a single data stream, and outputs it to a circuit in a subsequent stage. The request arbitration section arbitrates among the plurality of transfer requests so as to reduce a synchronization latency in the data synchronization section.

As employed herein, the "main memory" is a memory unit or memory device having an access time greater than that of the cache memories. The main memory may be one to be chiefly referred to by a main processor of the information processing apparatus, a graphic memory to be chiefly referred to by a graphic processor, or any external memory unit such as a hard disk and a CD-ROM (Compact Disc-Read Only Memory).

Another embodiment of the present invention relates to an information processing method. This information processing method comprises: determining whether or not data stored in an input address inside a main memory exists in a predetermined cache memory out of a plurality of cache memories; issuing a transfer request for the data from the main memory to the predetermined cache memory if it is determined that the data does not exist in the predetermined cache memory; arbitrating among a plurality of transfer requests; transmitting the plurality of transfer requests in accordance with a result of arbitration; transferring the data from the main memory to the predetermined cache memory in accordance with a transfer request transmitted; and synchronizing a plurality of transfer units of data transmitted to the plurality of cache memories into a single data stream for output. In arbitrating among a plurality of transfer requests, arbitration is made so as to reduce a synchronization latency.

Incidentally, any combinations of the foregoing components, and any conversions of expressions of the present invention from/into methods, apparatuses, systems, computer programs, and the like are also intended to constitute applicable embodiments of the present invention.

DETAILED DESCRIPTION OF THE INVENTION

The invention will now be described based on the preferred embodiments. This does not intend to limit the scope of the present invention, but exemplify the invention.

FIRST EMBODIMENT

Figure 1:
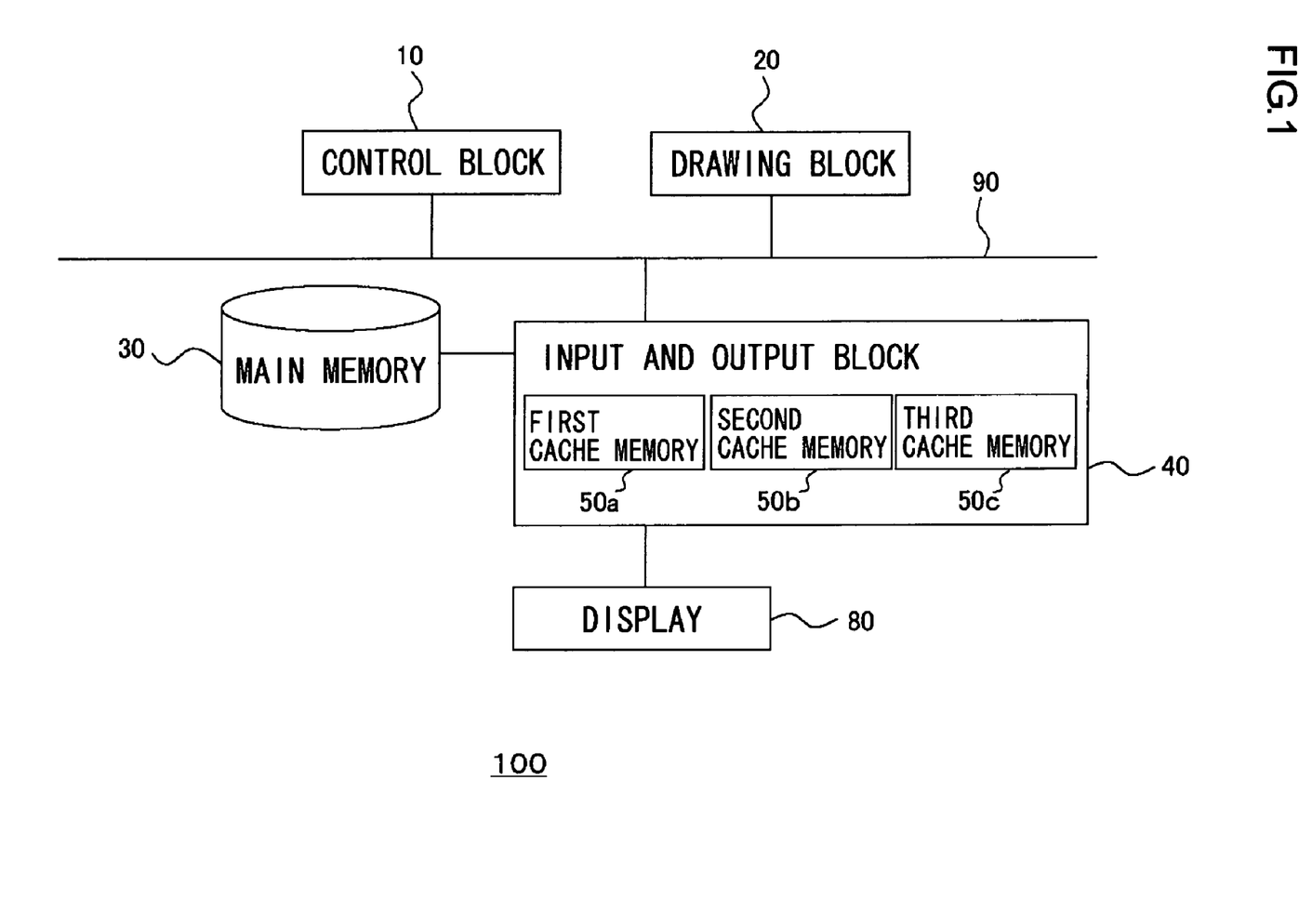
FIG. 1 is a block diagram of an information processing apparatus according to a first embodiment.

FIG. 1 is a block diagram of an information processing apparatus 100 according to the present embodiment. The information processing apparatus 100 is a computer with enhanced drawing functions, and is formed by connecting a control block 10, a drawing block 20, and an input and output block 40 with a bus 90. A main memory 30 and a display 80 are connected to the input and output block 40. The main memory 30 may be connected to the input and output block 40 over a network.

The control block 10 is one for controlling this entire information processing apparatus 100. The control block 10 performs such processing as a read control on data from the main memory 30, synchronization management of data transfer with the main memory 30 and the display 80, handling of interrupts from individual sections inside the information processing apparatus 100, and timer management.

The input and output block 40 reads information for generating frame data to display (hereinafter, referred to as image data), stored in the main memory 30, and provides it to the drawing block 20. The information includes vertex coordinates, vertex parameters, and clip parameters. The main memory 30 stores these pieces of information collectively in a type-by-type fashion. Based on information input from the control block 10, the input and output block 40 extracts desired pieces of image data type by type and outputs them as a single data string called data stream. Hereinafter, the generation of a data stream from a plurality of pieces of data will be referred to as "synchronization" of data. For efficient data extraction processing, the input and output block 40 is provided with a plurality of cache memories 50a, 50b, and 50c, which copy and store part of the image data stored in the main memory 30 type by type. If the cache memories 50a, 50b, and 50c previously store desired pieces of image data, the image data is extracted from the corresponding cache memories 50a, 50b, and 50c. In FIG. 1, the cache memories are composed of a first cache memory 50a, a second cache memory 50b, and a third cache memory 50c. While the number of cache memories is not limited thereto, the following description will deal with the three cache memories 50a, 50b, and 50c.

The input and output block 40 also displays images on the display 80 based on the frame data output from the drawing block 20.

The drawing block 20 performs rendering for generating frame data based on data streams of image data supplied from the input and output block 40, and writing it to a not-shown frame buffer inside the main memory 30.

Figure 2:
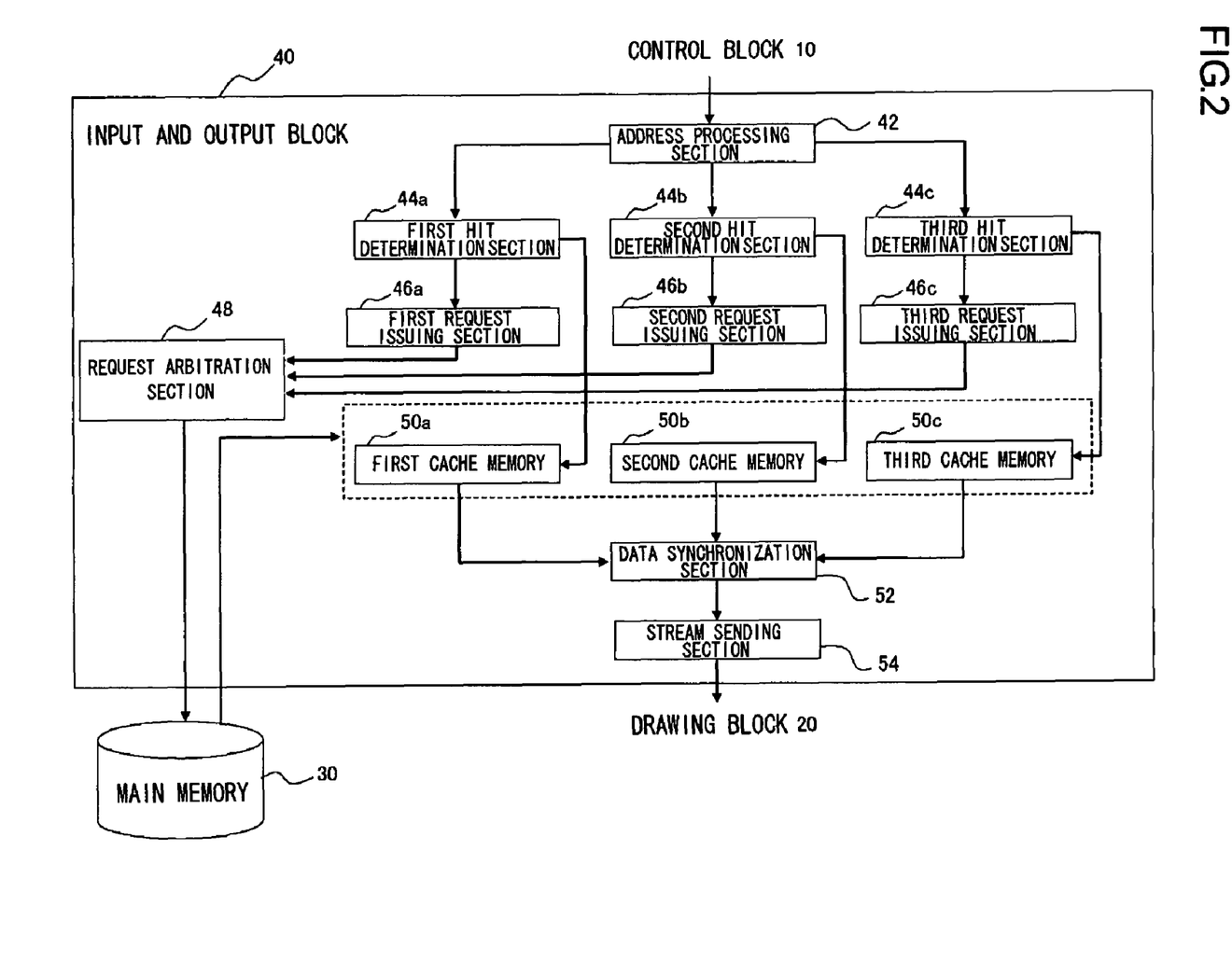
FIG. 2 is a block diagram of an input and output block according to the first embodiment.

FIG. 2 is a block diagram of the input and output block 40. As mentioned above, the input and output block 40 includes the three cache memories 50a, 50b, and 50c. The cache memories 50a, 50b, and 50c are made of semiconductor memories capable of high-speed accesses, such as a high-speed SRAM (Static Random Access Memory). The cache memories 50 contain not-shown tag memories.

The cache memories 50a, 50b, and 50c may be regarded as assemblies of "cache lines" each having a capacity equivalent to a read unit of data from the main memory 30. That is, a single transfer from the main memory 30 to the cache memories 50a, 50b, and 50c updates one of the cache lines.

The input and output block 40 also includes an address processing section 42 for allocating address information received from the control block 10 to any one of the first, second, and third cache memories 50a, 50b, and 50c. The address information describes the address of necessary image data inside the main memory 30. The address information establishes association between the type and address of image data. According to the type of image data, the address processing section 42 selects which of the target cache memories 50a, 50b, and 50c to allocate to. Alternatively, an address identification table containing addresses and identification numbers associated with each other in advance may be provided separately, so that the address information establishes association between the type and identification number of image data. In this case, the address processing section 42 consults the address information and the address identification table to identify an address specified by the control block 10, and allocates the address to any one of the cache memories 50a, 50b, and 50c depending on the data type.

The input and output block 40 also has a first hit determination section 44a, a second hit determination section 44b, and a third hit determination section 44c, and a first request issuing section 46a, a second request issuing section 46b, and a third request issuing section 46c, which are provided corresponding to the three cache memories 50a, 50b, and 50c, respectively. The hit determination sections 44a, 44b, and 44c contain not-shown comparators for inputting and comparing predetermined bits of address passed from the address processing section 42 and tag data stored in the tag memories included in the corresponding cache memories 50a, 50b, and 50c. The hit determination sections 44a, 44b, and 44c thereby determine whether or not desired pieces of data exist in the cache memories 50a, 50b, and 50c. The method of comparison will be described later. The request issuing sections 46a, 46b, and 46c issue a transfer request to the main memory 30 when it is determined that desired pieces of data do not exist in the corresponding cache memories 50a, 50b, and 50c.

The input and output block 40 also has a request arbitration section 48, a data synchronization section 52, and a stream sending section 54. The request arbitration section 48 arbitrates the order of a plurality of transfer requests transmitted from the three request issuing sections 46a, 46b, and 46c through respective signal lines, and transmits the transfer requests to the main memory 30. The data synchronization section 52 reads desired pieces of data stored in the three cache memories 50a, 50b, and 50c, and synchronizes them into a data stream. The stream sending section 54 sends the generated data stream to the drawing block 20. The number of signal lines for transmitting the transfer requests from the request arbitration section 48 to the main memory 30 may be one or more. The request arbitration section 48 arbitrates the order of the transfer requests so as to reduce the data read latency in the processing of synchronizing a plurality of pieces of data in the data synchronization section 52. The order determination will be detailed later.

As mentioned above, the data stream according to the present embodiment is a set of image data from which the drawing block 20 generates the frame data on images to be eventually displayed on the display 80 through rasterization, shading, and other processing. The drawing block 20 can perform efficient rasterization by processing this data stream as a single unit. The data for constituting the data stream need not be read from all the three cache memories 50a, 50b, and 50c. Data read from any two of the cache memories may constitute a data stream. Otherwise, data from a single cache memory may be simply output from the stream sending section 54. In this way, the present embodiment provides a plurality of cache memories and outputs data of small sizes as is and data of large sizes after synchronization. This minimizes the frequency of unnecessary data transfers, thereby allowing efficient data read.

Besides, the image data is used to generate frame data which requires real-time responses. In the present embodiment, the data is thus once stored into the cache memories 50a, 50b, and 50c, and pieces of data to be used repeatedly are read from the cache memories 50a, 50b, and 50c with an improvement to the processing speed of the frame data generation.

If the data constituting the data stream will not change in type as is the case with image data, then the types of data to be stored in the plurality of cache memories 50a, 50b, and 50c, respectively, can be set in advance as described above. For example, the first cache memory 50a may contain vertex coordinates, the second cache memory 50b vertex parameters, and the third cache memory 50c clip parameters. The main memory 30 may store data in its continuous area collectively in a type-by-type fashion, so that pieces of data are combined and formatted afterwards when generating frame data. This allows more flexible data read with higher efficiency, such that the frequency of unnecessary data accesses is reduced when image data is read only in part. This also saves the use area of the main memory 30 since pieces of data smaller than a single unit of read can be stored continuously.

Figure 3:
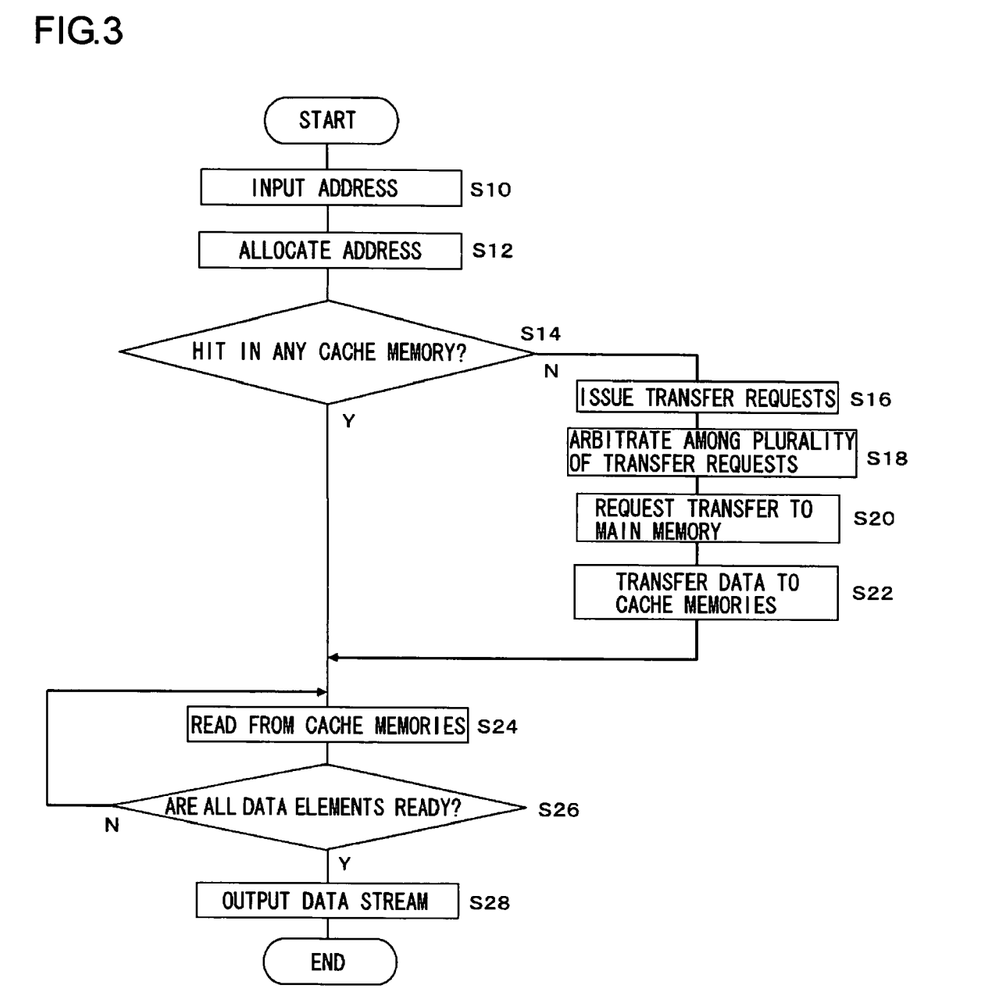
FIG. 3 is a flowchart showing the procedure for reading data and generating a data stream according to the first embodiment.

Next, description will be given of the operation of the input and output block 40 shown in FIG. 2. FIG. 3 is a flowchart showing the procedure for data read and data stream generation to be performed chiefly in the input and output block 40.

Initially, the control block 10 inputs address information on image data in the main memory 30, corresponding to frame data to be generated, to the input and output block 40 (S10). Based on the address information input, the address processing section 42 of the input and output block 40 allocates the specified address among the three hit determination sections 44a, 44b, and 44c (S12). The hit determination sections 44a, 44b, and 44c compare the addresses received and the information inside the cache memories, thereby determining the presence or absence of data corresponding to the addresses (S14). The comparison technique is selected in advance from among ones used typically, such as a direct map method and a full associative method. In the former method, intermediate bits of the address in the main memory 30 serve as addresses for designating cache lines, and upper bits are stored into the tag memories corresponding to the respective cache lines. Thus, cache lines are initially identified from the intermediate bits, and the upper bits and the tag data are compared by the comparators. In the latter method, all the upper bits and intermediate bits are stored into the tag memories. Comparison is thus made between the upper and intermediate bits of the addresses and the tag data. In either case, if there is matching tag data in the cache memories 50a, 50b, and 50c, it is determined that the desired data exists in the cache memories 50a, 50b, and 50c, or "hits" (Y at S14). If there is no matching tag data, it is determined that the desired data does not exist in the cache memories 50a, 50b, and 50c, or "misses" (N at S14).

If the determination is a "miss" (N at S14), the corresponding request issuing sections 46a, 46b, and 46c issue a transfer request for that data to the cache memories 50a, 50b, and 50c corresponding to the respective request issuing sections 46a, 46b, and 46c. The request arbitration section 48 receives the requests (S16). A single address input from the control block 10 produces read requests for a plurality of data elements for constituting a single data stream simultaneously, including vertex coordinates and vertex parameters. It follows that the request arbitration section 48 almost simultaneously receives a plurality of transfer requests for the data that is determined to be a "miss."

Receiving a plurality of transfer requests, the request arbitration section 48 determines the order of transmission to the main memory 30, and transmits the transfer requests based on the determination (S20). As mentioned above, the request arbitration section 48 determines the order of the transfer requests so as to reduce a stall time, or processing stop time, of the data synchronization section 52 during the processing of the data stream generation. In the meantime, the request arbitration section 48 continues to accept transfer requests issued by the request issuing sections 46a, 46b, and 46c, and holds them until transmission to the main memory 30.

In accordance with the transfer requests, the main memory 30 transfers the data stored in the specified addresses to the designated cache memories 50a, 50b, and 50c (S22). The addresses may be included in the transfer requests issued by the request issuing sections 46a, 46b, and 46c. Alternatively, when addresses are specified by the control block 10, the address processing section 42 may transmit the addresses to the main memory 30 previously so that those addresses are enabled and referred to only when transfer requests are transmitted. The data transfer is performed in certain read units (hereinafter, in units of e.g. "eight bytes"). In the cache memories 50a, 50b, and 50c, each individual area containing eight bytes of data serves as a cache line. Part of the addresses in the main memory 30, of the data transferred to the cache memories 50a, 50b, and 50c, are stored into the tag memories built in the cache memories 50a, 50b, and 50c as tag data.

The data synchronization section 52 reads desired data elements for constituting a data stream (S24) from the cache memory or cache memories 50 that is/are determined to be a "hit" by the hit determination section(s) 44 (Y at S14) and/or from the cache memory or cache memories 50 that contain data transmitted from the main memory in response to the issuance of the transfer request(s) (S22), respectively. The data read is repeated unless all the data elements are ready (N at S26). When all the data element are ready (Y at S26), the stream sending section 54 outputs this data stream to the drawing block 20 (S28).

Figure 4:
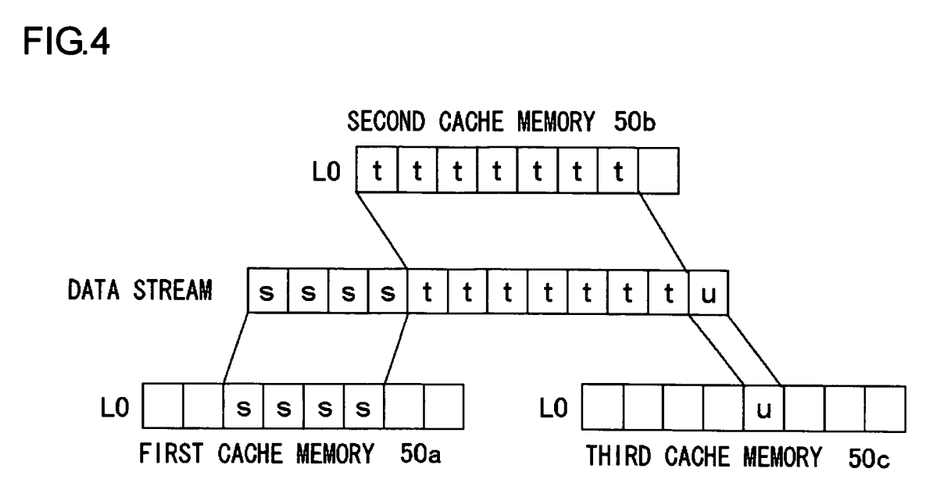
FIG. 4 is a diagram schematically showing how a data stream is generated from data stored in cache lines according to the first embodiment.

Now, description will be given of the order of issuance of a plurality of transfer requests to be determined by the request arbitration section 48. As described above, data is transferred from the main memory 30 to the cache memories 50a, 50b, and 50c in units of eight bytes. However, data elements to be read by the data synchronization section 52 are often equivalent to only part of the cache lines which contain eight bytes of data. FIG. 4 schematically shows how the data synchronization section 52 reads data that is stored in certain cache lines L0 in the three cache memories 50a, 50b, and 50c, and generates a data stream. Here, each single cache line is divided into eight equal sizes of data, i.e., one byte which is represented by a unit rectangle. In the diagram, the data synchronization section 52 reads the following: four bytes (in the diagram, indicated with "s") stored in the third to sixth bytes of the cache line L0 of the first cache memory 50a; seven bytes (in the diagram, indicated with "t") stored in the first to seventh bytes of the cache line L0 of the second cache memory 50b; and one byte (in the diagram, indicated with "u") stored in the fifth byte of the cache line L0 of the third cache memory 50c. The data synchronization section 52 thereby generates a 12-byte data stream.

To complete the data stream in the data synchronization section 52, all the components or data elements, i.e., the data "s", "t", and "u" must be written in some of the cache lines included in the cache memories 50a, 50b, and 50c as shown in FIG. 4. Like the data "t" of the second cache memory 50b in FIG. 4, the greater the size of data to be read by a single read of the data synchronization section 52 (hereinafter, referred to simply as data size) is, the smaller the number of data a cache memory can store in its finite area. This means a higher probability of a "miss" occurring in the hit determination. The "number of data" shall refer to the number of pieces of data in units of the foregoing data size. On the other hand, like the data "u" of the third cache memory 50c, the smaller the data size is, the greater the number of data a cache memory can store. This means a higher probability of a "hit."

If the second cache memory 50b is always in charge of large-sized data such as the data "t," the probability that new data must be transferred and written from the main memory 30 becomes higher than in the other cache memories 50a and 50c. Since it is impossible to read desired data until the data write ends and the data is stored into the cache memories, the data synchronization section 52 must wait for the end of this write period before completing the data stream. The time during which processing to be originally performed must be suspended to wait for the end of processing of other modules appears as a stall time. In the present embodiment, data sizes depend substantially on the types of data for constituting a data stream of image data, such as vertex coordinates, vertex parameters, and clip parameters. Thus, if cache memories 50a, 50b, and 50c to take charge are allocated depending on the types of data, a certain cache memory 50a, 50b, or 50c alone can grow in the frequency of data writes with an increase in stall time.

Then, the request arbitration section 48 determines the order of transmission of a plurality of transfer requests to the main memory 30 so as to reduce the stall time in the data synchronization section 52. Specifically, transfer requests for pieces of data of greater sizes are transmitted to the main memory 30 by priority since such data can increase the probabilities of requiring a write to the cache memories 50a, 50b, and 50c, i.e., increase the frequency of data transfers from the main memory 30 to the cache memories 50a, 50b, and 50c as described above.

For example, the request arbitration section 48 is provided with a maximum value determination circuit (not shown) using previously-known techniques. The request issuing sections 46a, 46b, and 46c then issue transfer requests including data sizes, so that the maximum value determination circuit identifies a transfer request of the maximum data size out of the plurality of transfer requests accepted by the request arbitration section 48. When data sizes are fixed depending on the data types, the priorities may be set uniquely and fixedly by the target cache memories 50. In this case, association between transfer requests and the three cache memories 50a, 50b, and 50c can be acquired when the three request issuing sections 46a, 46b, and 46c input their transfer requests to the request arbitration section 48 through respective signal lines as described above. The request arbitration section 48 may compare the sizes of data for constituting a single data stream upon each transfer request. It may otherwise transmit transfer requests in the order of descending data sizes out of all the transfer requests stored.

According to the present embodiment, pieces of data of greater sizes are stored into the cache memories 50a, 50b, and 50c by priority. This can reduce differences in memory-access penalty due to differences in the probability of "miss" determinations. As a result, it is possible to reduce the stall time for writing data to the cache memories, and by extension the time until the completion of a data stream by combination with pieces of data of smaller sizes which have higher probabilities of a "hit." This accelerates the processing for acquiring image data necessary for generating frame data, thereby allowing efficient generation of the frame data. The present embodiment can be realized through relatively simple improvements such as circuit insertion and program modification. The effect of reducing data read time can thus be obtained more easily at lower cost than by increasing the bus bandwidth or by accelerating the main memory 30.

In the present embodiment, as described above, transfer requests are transmitted in the order of descending data sizes because the greater the sizes of data are, the higher the frequency of write to the cache memories 50a, 50b, and 50c becomes. Depending on the actual data sizes and other environmental factors, other modes of ordering may be combined as appropriate. For example, in such cases that data sizes do not vary much except a certain data type and that the transmission of data streams to the drawing block 20 has a predetermined time limit, priority may be given to transfer requests for data pertaining to the predetermined type alone. Here, transfer requests for data pertaining to the other types may be transmitted in the order of acceptance in the request arbitration section 48. As a result, it is possible to maximize the effect of reducing the stall time by the same principle as described above with consideration given to such factors as the significance of the data. This consequently provides a mode of higher flexibility.

SECOND EMBODIMENT

In the first embodiment, the order of transmission of a plurality of transfer requests to the main memory 30 is determined based on the sizes of data. In the present embodiment, the request arbitration section 48 makes adjustments to the timing for transmitting the transfer requests. The present embodiment can also be achieved by the same configuration as the information processing apparatus 100 shown in FIG. 1 as well as the input and output block 40 shown in FIG. 2 according to the first embodiment. The procedure to be chiefly performed by the input and output block 40 is also the same as in FIG. 3 according to the first embodiment. Then, a difference from the first embodiment, i.e., the adjustment of the transmission timing will be described here.

Figure 5:
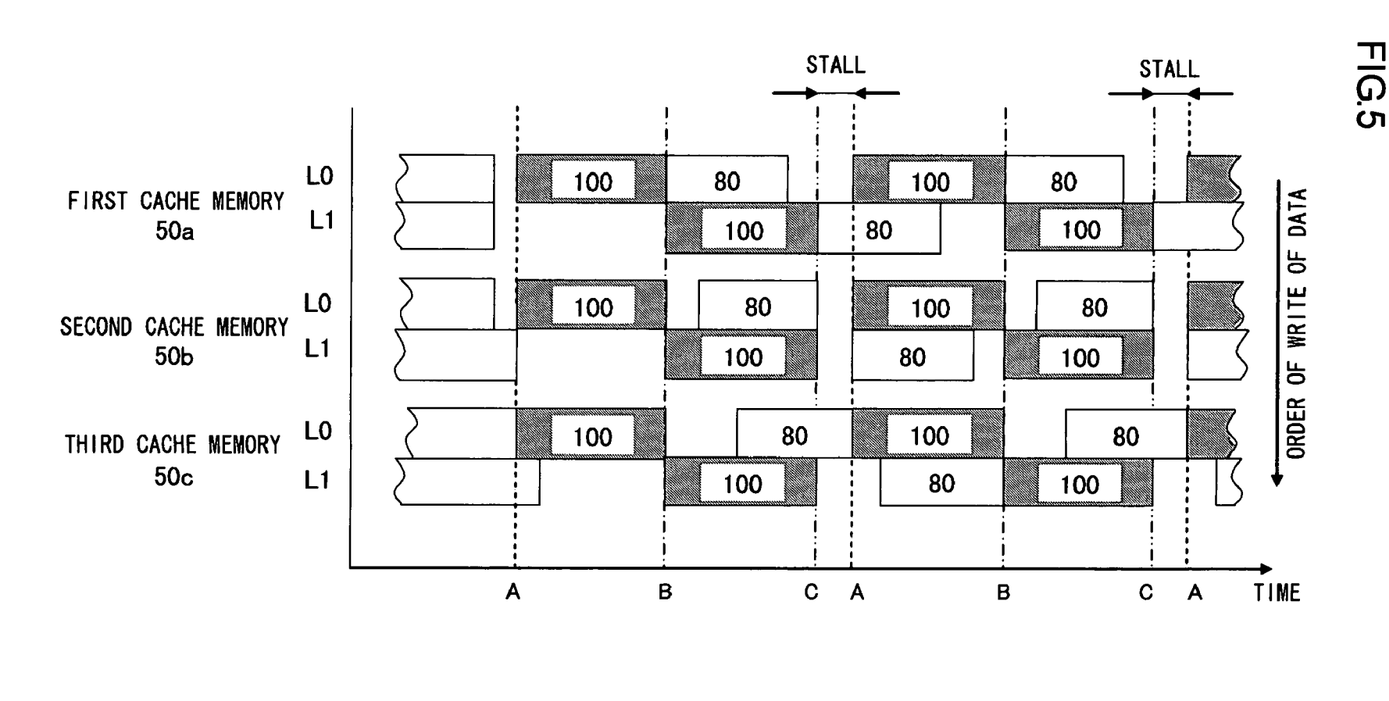
FIG. 5 is a timing chart showing the timing of data read and data write in each cache memory in a case where no timing adjustment is made to transfer requests.

Initially, for the sake of clarifying the effect of the present embodiment, description will be given of the case where no timing adjustment is made to transfer requests. FIG. 5 is a timing chart showing the timing of data read and data write in the first cache memory 50a, the second cache memory 50b, and the third cache memory 50c. For ease of explanation, each of the cache memories 50a, 50b, and 50c shall have two cache lines L0 and L1 alone, i.e., have two ways of LRU (Least Recently Used) system with a single entry each. That is, if a piece of data from an address is written to one cache line L0 and then a subsequent piece of data is determined to be a "miss," that piece of data is written to the other cache line L1. Subsequently, the two cache lines L0 and L1 are written alternately. In the diagram, the horizontal axis indicates time. Outlined rectangles in each cache line represent refill periods or write periods for data transfer. Hatched rectangles represent data read periods of the data synchronization section 52.

In the present embodiment, any data is once written to the cache memories 50a, 50b, and 50c before output to the data synchronization section 52. This structure yields some penalties upon "miss" determinations, whereas it eliminates the need for the bus for transmitting data directly from the main memory 30 to the data synchronization section 52, thereby allowing a considerable merit for implementation. This structure is thus useful for applications that are likely to show relatively high hit rates.

Returning to the diagram, the numerals shown in the respective rectangles indicate the numbers of clocks necessary for operation. Specifically, a whole lineful of data shall be written to the cache lines L0 and L1 of all the cache memories 50a, 50b, and 50c in 80 cycles, and read in 100 cycles.

For the sake of simplicity, the present embodiment will deal with the case where all the pieces of data for constituting a data stream have the same size which is equal to the size of data to be transferred from the main memory 30. Consequently, reading an entire piece of data from the respective cache lines requires the same amounts of time, equivalent to 100 cycles mentioned above. Moreover, in the present embodiment, data is transferred from the main memory 30 by using a bus common to the three cache memories 50a, 50b, and 50c. As shown to the right in the diagram, the data transfer is repeated in order of the first cache memory 50a, the second cache memory 50b, and the third cache memory 50c. The data transfer to the cache memories 50a, 50b, and 50c can only be performed at certain intervals because of bus neck. Here, a data write to the cache memories 50a, 50b, and 50c shall be performed once every 20 cycles. Note that the diagram shows a worst case, where all the accesses are determined to be a "miss," followed by a write to the cache memories 50a, 50b, and 50c. In reality, accesses are often determined to be a "hit." In other words, "miss" determinations and penalties do not occur so regularly as in the diagram.

In the diagram, time A represents the timing at which the read periods of the cache lines L0 in the respective cache memories 50a, 50b, and 50c start. Time B represents the timing at which the read periods of the cache lines L0 end, and the next read of the other cache lines L1 starts. At this time B, the still next access is determined to be a "miss," and transfer requests for the cache lines L0 are transmitted to the main memory 30. Nevertheless, because of the bus neck mentioned above, the write periods of the cache lines L0 of the three cache memories 50a, 50b, and 50c start at intervals of 20 cycles. Time C represents the timing at which the data stored in the cache lines L1 is read completely and it becomes possible to read the data stored in the cache lines L0.

In the case of FIG. 5, the data read of the cache lines L1 of all the cache memories 50a, 50b, and 50c has ended at time C. Nevertheless, the cache line L0 of the third cache memory 50c is still being written because of the foregoing bus neck, and thus the data for constituting a data stream is not ready yet. This makes it impossible for the data synchronization section 52 to start reading the cache lines L0. The data read cannot be started until the time when the data write to the cache line L0 of the third cache memory 50c ends (shown as the second "time A" in the diagram). The period between the time C and the time A thus makes a stall time.

The transfer requests for transferring data to the cache lines of the three cache memories 50a, 50b, and 50c are transmitted to the main memory 30 at time B, i.e., simultaneously with the end of the previous data read of the respective cache lines. In the case of FIG. 5, the timing to start reading the cache lines coincides with the timing at which all the data for constituting a data stream becomes ready. The start timing is thus identical among all the cache memories 50a, 50b, and 50c. Consequently, as described above, the transfer requests for the next data are transmitted to the main memory 30 simultaneously at time B.

As above, data is written to the cache memories 50a, 50b, and 50c once every 20 cycles. Even if the transfer requests for the respective cache memories 50a, 50b, and 50c are transmitted to the main memory 30 almost simultaneously at time B, it is therefore impossible to start writing data at a time. As a result, the end timing of write of the third cache memory 50c lags behind that of the other cache memories 50a and 50b, thereby causing a stall time. This phenomenon becomes more apparent as the cache memories to store data for constituting a single data stream increase in number.

Next, description will be given of the present embodiment. The present embodiment is configured so that three transfer requests are transmitted with time intervals therebetween. Specifically, the main memory 30 stores data into addresses that are given respective different offsets depending on the data types with respect to the boundaries of read units which are identified by the upper and intermediate bits of addresses. It follows that the addresses specified by the control block 10 designate intermediate addresses of the data strings in read units.

Figure 6A:
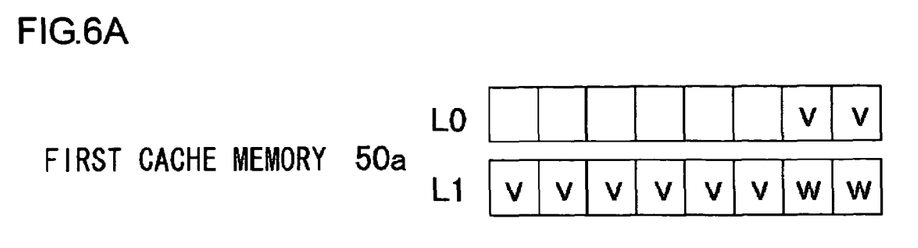
FIG. 6A is a diagram schematically showing an example of arrangement of data stored in cache lines in a first cache memory according to a second embodiment.
Figure 6B:
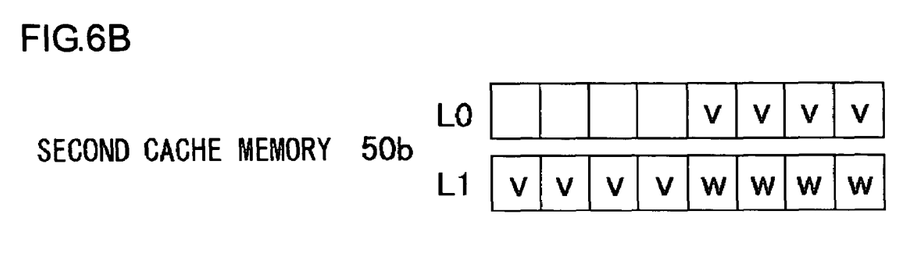
FIG. 6B is a diagram schematically showing an example of arrangement of data stored in cache lines in a second cache memory according to the second embodiment.
Figure 6C:
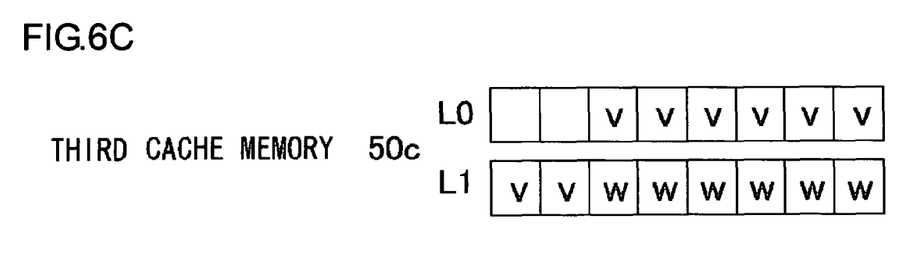
FIG. 6C is a diagram schematically showing an example of arrangement of data stored in cache lines in a third cache memory according to the second embodiment.

FIGS. 6A, 6B, and 6C schematically show an example of data arrangement when pieces of data stored in the main memory 30, with the foregoing offsets, are stored into the first cache memory 50a, the second cache memory 50b, and the third cache memory 50c, respectively. As in FIG. 4, the cache lines shall be in units of 8 bytes each, for example. Each single byte is shown by a unit rectangle. A total of eight bytes (in the diagram, indicated with "v"), or the two bytes stored in the seventh and eighth bytes of the cache line L0 of the first cache memory 50a and the six bytes stored in the first to sixth bytes of the cache line L1, are read by the data synchronization section 52 at a time. The same holds for the eight bytes indicated with "v" in the second cache memory 50b and the third cache memory 50c. Moreover, the several bytes indicated with "w" in the cache memories 50a, 50b, and 50c represent data that is stored subsequent to the data indicated with "v" in the main memory 30.

FIGS. 6A, 6B, and 6C respectively show that the data the first cache memory 50a contains is stored in the main memory 30 with an offset of six bytes, the data the cache memory 50b contains is with an offset of four bytes, and the data the cache memory 50c contains is with an offset of two bytes. Consequently, every eight bytes of data "v" read by the data synchronization section 52 at a time is stored across two cache lines. In this example, a single address input from the control block 10 causes two transfer requests for transferring 16 bytes of data to the two cache lines L0 and L1 in eight bytes each. Since whether two transfer requests are needed or not is known previously from data sizes and data types which determine the offset values, the request issuing sections 46a, 46b, and 46c include that information into their transfer requests. The request arbitration section 48 then associates identification information on target cache lines with the start addresses of the boundaries in read units, obtained by subtracting the offset values from the start addresses of data specified by the control block 10, and the start addresses of the next boundaries in read units stored in the main memory 30. The request arbitration section 48 includes the resultant into transfer requests to be transmitted to the main memory 30. For that purpose, the request arbitration section 48 includes a not-shown offset subtracting circuit and address adding circuit which are provided by using previously-known techniques.

Figure 7:
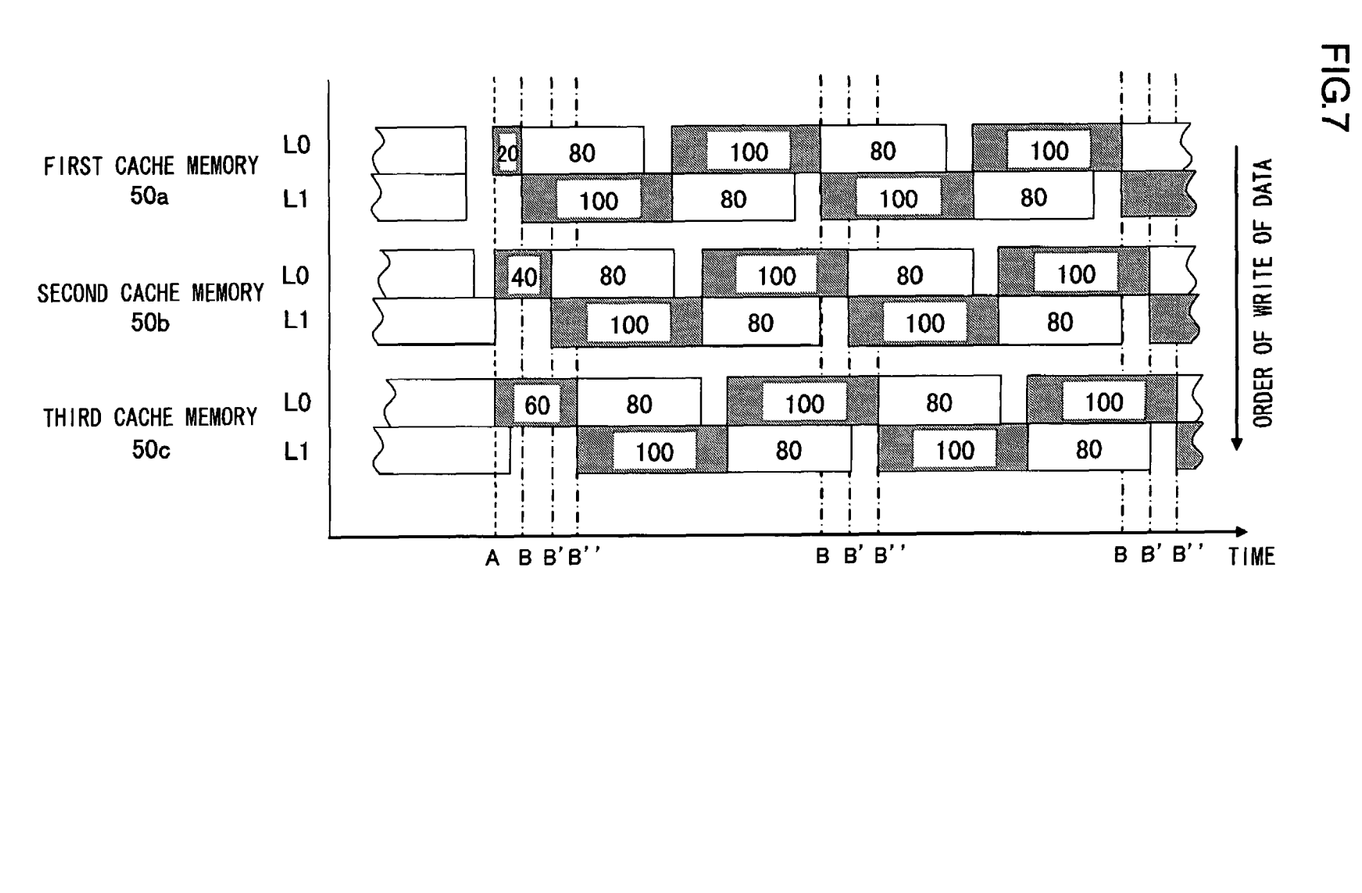
FIG. 7 is a timing chart showing the timing of data read and data write in each cache memory according to the second embodiment.

FIG. 7 is a timing chart showing the timing of data read and data write in the first cache memory 50a, the second cache memory 50b, and the third cache memory 50c according to the present embodiment. The basic conditions of FIG. 7 are the same as in FIG. 5.

In FIG. 7, the first read periods of the cache lines L0 correspond to ones for reading the data "v" in FIGS. 6A, 6B, and 6C. More specifically, the two bytes of data is read from the first cache memory 50a in 20 cycles. The four bytes of data is read from the second cache memory 50b in 40 cycles. The six bytes of data is read from the third cache memory 50c in 60 cycles. In the present embodiment, the cache lines L0 are updated at the points in time when these read periods end. That is, the request arbitration section 48 transmits the transfer requests for transferring data to the cache lines L0 of the respective cache memories 50a, 50b, and 50c, to the main memory 30 at the respective points in time when the read periods end. In the present embodiment, the read periods of the cache memories 50a, 50b, and 50c end at respective different timings. The first cache memory 50a thus transmits its transfer request at time B, the second cache memory 50b at time B', and the third cache memory 50c at time B". In other words, the three transfer requests are transmitted at time intervals of 20 cycles. The provision of the time intervals in transferring the transfer requests can eliminate a delay time in starting writing to the cache memories 50a, 50b, and 50c with respect to the timing of transmission of the transfer requests due to the foregoing bus neck.

After the read periods of the cache lines L0 end, the cache lines L1 are read while the cache lines L0 are written with data according to next transfer requests. In the case of FIGS. 6A, 6B, and 6C, the rest of the data "v" stored in the cache lines L1 and part of the data "w" are read in this period. Since the same processing is repeated, the read periods of the cache memories 50 end at respective different timings. The timing of transmission of their transfer requests can thus be distributed among times B, B', and B" all the time. For the sake of simplicity of the diagram, FIG. 7 only shows time A, time B, and other notations for the cache line L1 alone as in FIG. 5.

According to the present embodiment, data is stored into addresses that are given respective different offsets depending on the data types with respect to addresses that designate the original boundaries in read units in the main memory 30. The memory addresses on the cache lines of the cache memories 50a, 50b, and 50c are thus also provided with the different offsets depending on the respective cache memories 50a, 50b, and 50c. Thus, even if a plurality of pieces of data for constituting a single data steam end to be read at the same timing, the timings when the entire pieces of data are read from the cache lines differ from one cache memory to another. As a result, it is possible to change the timing of transmission of transfer requests depending on the target cache memories 50a, 50b, and 50c. This eliminates the delay of start of writing to the cache memories with respect to the timing of transmission of the transfer requests due to bus neck. As a result, it is possible to avoid an increase in stall time ascribable to the delay time even if the cache memories to store data for constituting a data stream increase in number. Moreover, since transfer requests are transmitted at distributed timing, the load on the bus to be shared among the plurality of cache memories is also distributed. This can sometimes reduce even the write periods themselves. As a result, the processing of acquiring image data is accelerated further with a significant improvement to the efficiency of frame data generation. In the present embodiment, the foregoing effects can be obtained easily at low cost as in the first embodiment.

While the foregoing description has dealt with the case where all the data elements constituting a data stream have an identical size, the same effects can also be obtained by the same principle even with different sizes.

Up to this point, the present invention has been described in conjunction with the embodiments thereof. The foregoing embodiments have been given solely by way of illustration. It will be understood by those skilled in the art that various modifications may be made to combinations of the foregoing components and processes, and all such modifications are also intended to fall within the scope of the present invention.

The foregoing embodiments have dealt with the cases where the data stream is made of a set of image data for generating frame data. Nevertheless, a plurality of types of data may be used as a set and subjected to processing. For example, voice data or the like may be used. Even in this case, it is possible to improve the data read efficiency easily at relatively low cost, with the result of speedup of the processing.

The foregoing embodiments have also dealt with the cases where the main memory contains data in a type-by-type fashion, and the cache memories, or transfer targets, are also provided for the respective types of data. Nevertheless, the load on the cache memories may be shared based on other attributes. For example, data may be stored into the main memory irrespective of the types so that it is transferred to cache memories that are allocated on an address-range basis. Moreover, read requests from the control block may be allocated by turns irrespective of any particular attributes. Depending on such factors as the details of processing in subsequent stages and the structure of the data stream, a mode of higher efficiency may be selected and applied to the foregoing embodiments. This makes it possible to achieve the effect of accelerating the read processing through a reduction of the foregoing stall time with higher efficiency.

What is claimed is:

1. An information processing apparatus comprising:
a plurality of request issuing sections which issue read requests for data stored in a memory;
a request arbitration section which accepts the read requests, arbitrates among a plurality of the read requests, and transmits read requests to the memory; and
a data synchronization section which synchronizes a plurality types of data read from the memory in accordance with the read requests transmitted, and outputs the plurality types of data as a single data stream, wherein
the request arbitration section arbitrates among the plurality of read requests so as to reduce waiting time before all the types of data constituting the single data stream are ready in the data synchronization section.

2. The information processing apparatus according to claim 1, wherein the request arbitration section arbitrates order of transmission of the plurality of read requests to the memory.

3. The information processing apparatus according to claim 1, wherein time intervals at which the plurality of read requests are transmitted to the memory are adjusted as a result of arbitration among the plurality of read requests by the request arbitration section.

4. An information processing apparatus comprising:
a plurality of cache memories;

a plurality of hit determination sections provided corresponding to the plurality of cache memories, respectively, the hit determination sections determining whether or not data stored in an input address inside a main memory exists in the cache memories;

a plurality of request issuing sections provided corresponding to the plurality of hit determination sections, respectively, the request issuing sections issuing transfer requests for the data from the main memory to the cache memories if it is determined that the data does not exist in the cache memories;

a request arbitration section which accepts the transfer requests, arbitrates among a plurality of the transfer requests, and transmits transfer request to the main memory; and a data synchronization section which synchronizes a plurality of transfer units of data transferred from the main memory to the plurality of cache memories in accordance with the transfer requests transmitted into a single data stream, and outputs the single data stream to a circuit in a subsequent stage, wherein the request arbitration section arbitrates among the plurality of transfer requests so as to reduce a synchronization latency in the data synchronization section.

5. The information processing apparatus according to claim 4, wherein:

the data stream is a set of image data for use in generating a single piece of frame data in image processing to be performed in a subsequent stage; and the plurality of cache memories contain data on respective types of image data.

6. The information processing apparatus according to claim 4, wherein the request arbitration section arbitrates order of transmission of the plurality of transfer requests to the main memory.

7. The information processing apparatus according to claim 6, wherein the request arbitration section transmits the transfer requests to the main memory with priority given to one transfer request for data more likely to be determined not to exist in the cache memories by the hit determination sections.

8. The information processing apparatus according to claim 6, wherein the request arbitration section transmits the transfer requests to the main memory with priority given to one transfer request for data having a greater size than the other transfer request.

9. The information processing apparatus according to claim 6, wherein the request arbitration section transmits a read request for data pertaining to a predetermined type, out of the plurality of transfer requests, to the main memory by priority.

10. The information processing apparatus according to claim 4, wherein a time interval at which the plurality of transfer requests are transmitted to the main memory is adjusted as a result of arbitration among the plurality of transfer requests by the request arbitration section.

11. The information processing apparatus according to claim 10, wherein the time intervals at which the request arbitration section transmits the plurality of transfer requests to the main memory are adjusted by giving respective different offsets, depending on the cache memories, to start addresses of storage areas where data is stored in cache lines included in the cache memories, the different offsets being measured with respect to start addresses of each cache line.

12. An information processing method comprising:
accepting a read request for data stored in a memory;
arbitrating a plurality of the read requests;
transmitting the plurality of read requests to the memory in accordance with a result of arbitration;
synchronizing a plurality types of data read from the memory in accordance with the read requests transmitted;
outputting the plurality types of data as a single data stream, wherein
in arbitrating the plurality of read requests, arbitration is made so as to reduce waiting time before all the types of data constituting the single data stream are ready for output.

13. An information processing method comprising:
determining whether or not data stored in an input address inside a main memory exists in a predetermined cache memory out of a plurality of cache memories;
issuing a transfer request for the data from the main memory to the predetermined cache memory if it is determined that the data does not exist in the predetermined cache memory;
arbitrating among a plurality of the transfer requests;
transmitting the plurality of transfer requests in accordance with a result of arbitration;
transferring the data from the main memory to the predetermined cache memory in accordance with a transfer request transmitted; and
synchronizing a plurality of transfer units of data transmitted to the plurality of cache memories into a single data stream for output, wherein
in arbitrating among the plurality of transfer requests, arbitration is made so as to reduce a synchronization latency.

14. The information processing method according to claim 13, wherein in arbitrating among the plurality of transfer requests, order of transmission to the main memory is determined so as to give priority to a transfer request for data more likely to be determined not to exist in the cache memories.

15. The information processing method according to claim 13, wherein in arbitrating among the plurality of transfer requests, time intervals at which the plurality of transfer requests are transmitted to the main memory are adjusted by giving respective different offsets, depending on the cache memories, to staff addresses of storage areas where data is stored in cache lines included in the cache memories, the different offsets being measured with respect to start addresses of each cache line.

16. A data stream generation method comprising:
issuing a plurality of read requests;
reading a plurality types of data from a memory in accordance with the plurality of read requests; and
synchronizing the plurality types of data read from the memory into a single data stream for output, wherein
the issuing comprises adjusting timing of issuance of the plurality of read requests so as to reduce waiting time before all the types of data constituting the single data stream are ready for output.

17. An information processing apparatus comprising:
a plurality of request issuing sections which issue read requests for data stored in a memory;
a request arbitration section which accepts the read requests, arbitrates among a plurality of the read requests, and transmits read requests to the memory; and
a data synchronization section which synchronizes a plurality types of data read from the memory in accordance with the read requests transmitted, and packetizes the plurality types of data into a single data stream for output, wherein
the request arbitration section arbitrates order of transmission of the plurality of read requests to the memory.

18. An information processing apparatus comprising:
a plurality of request issuing sections which issue read requests for data stored in a memory;
a request arbitration section which accepts the read requests, arbitrates among a plurality of the read requests, and transmits read requests to the memory; and
a data synchronization section which synchronizes a plurality types of data read from the memory in accordance with the read requests transmitted, and outputs the plurality types of data as a single data stream, wherein
time intervals at which the plurality of read requests are transmitted to the memory are adjusted as a result of arbitration among the plurality of read requests by the request arbitration section.

* * * * *